(12) United States Patent
Rokkan

(10) Patent No.: US 6,483,776 B1
(45) Date of Patent: Nov. 19, 2002

(54) SEISMIC CABLE WITH SENSOR ELEMENTS BEING HEAVIER THAN THE CABLE

(76) Inventor: Arne Rokkan, Olsvikskrenten 38, N-5079 Olsvik (NO)

( * ) Notice: Subject to any disclaimer, the term of this patent is extended or adjusted under 35 U.S.C. 154(b) by 0 days.

(21) Appl. No.: 09/831,446
(22) PCT Filed: Nov. 11, 1999
(86) PCT No.: PCT/NO99/00340
§ 371 (c)(1), (2), (4) Date: Jul. 16, 2001
(87) PCT Pub. No.: WO00/29874
PCT Pub. Date: May 25, 2000

(30) Foreign Application Priority Data

Nov. 13, 1998 (NO) .......................... 19985323

(51) Int. Cl.$^7$ ................................. G01V 1/38
(52) U.S. Cl. ......................... 367/20; 367/165
(58) Field of Search ............ 367/20, 165, 154, 367/15, 16, 17; 174/101.5; 181/122, 402

(56) References Cited

U.S. PATENT DOCUMENTS

| 4,300,220 A | 11/1981 | Goff et al. |
| 4,334,296 A | 6/1982 | Hall Jr. |
| 4,398,276 A | 8/1983 | Kruppenbach |
| 4,599,713 A | 7/1986 | Rudaz |
| 4,649,530 A | 3/1987 | Porter, Jr. |
| 4,725,990 A | 2/1988 | Zibilich, Jr. |
| 4,809,245 A | 2/1989 | Woodall et al. |
| 4,870,625 A | 9/1989 | Young |
| 4,942,557 A | 7/1990 | Seriff |
| 5,130,954 A | 7/1992 | Fussell |
| 5,163,028 A | 11/1992 | Barr et al. |
| 5,365,491 A | 11/1994 | Sullivan et al. |
| 5,568,447 A | 10/1996 | Williams |
| 5,747,754 A | 5/1998 | Svenning et al. |
| 5,774,423 A | 6/1998 | Pearce et al. |

FOREIGN PATENT DOCUMENTS

| GB | 2 300 917 A | 11/1996 |
| WO | WO 98/07050 A1 | 2/1998 |

OTHER PUBLICATIONS

PGS Reservoir Newsletter, Jun. 1996, 4 pages.
Berteussen, K.A. et al., Oil & Gas Journal, "Marine Four Component Acquisition Boosts Role of Shear–Wave Data in Seismic Work" Nov. 3, 1997, 5 pages.

Primary Examiner—Gregory J. Toatley, Jr.
(74) Attorney, Agent, or Firm—Rothwell, Figg, Ernst & Manbeck, P.C.

(57) ABSTRACT

Seismic cable for placing on the sea bottom comprising two or more seismic sensor units adapted to detect vibrations in the sea floor and being separated by chosen lengths of cable. The cable is characterize in that the sensor units are substantially heavier per length unit than the cable between them.

10 Claims, 2 Drawing Sheets

SEISMIC CABLE WITH SENSOR ELEMENTS BEING HEAVIER THAN THE CABLE

The present invention relates to a seismic cable for positioning on the sea floor comprising two or more seismic sensor units adapted to detect vibrations in the sea floor and being separated by chosen lengths of cable.

Marine seismic studies are usually performed with seismic cables being towed by a vessel at the sea surface, the seismic cables comprising a number of hydrophones recording pressure waves being reflected from the geological formations beneath the sea floor, the pressure waves being generated by seismic sources such as air guns. It is, however, known that certain geological formations may convert pressure waves into shear waves that are not transmitted through water and thus are not registered by the hydrophone cables. Thus additional information are obtained by placing sensors on the sea floor being capable of registering these shear waves.

A number of different systems have been suggested to measure these waves, e.g. in U.S. Pat. Nos. 5,265,066 and 5,747,754. In these publications cables are described comprising geophones being placed on the sea floor to detect vibrations. A problem being addressed in the publications is how to obtain sufficient acoustic contact against the sea floor. In the first these is solved by making the geophone units heavy, which limits the frequencies that may be received.

In U.S. Pat. No. 5,747,754 the problem with the coupling to the ground is solved by enclosing vibrators in the geophone units. By letting the sensor units vibrate they will dig themselves down into the sea floor, and thus improve the contact. It is also said that the geophones should have a specific weight corresponding to the material at the sea floor. This is a prejudice being common in the art.

In 5,365,491 a solution is described in which one or more geophones are positioned outside the cable being enclosed in sand bags in order to improve the contact on a hard surface. This gives, however a distributed weight over the surface and thus a low weight per length unit and thus a bad acoustic coupling to the surface. This solution will therefore, if it contrary to the intent of the patent is used on a sandy surface, not give any better contact with the surface as the sand in the bags will behave in the same way as the sand outside, and the real effect will be the same as if the bags were not there and the sensor was positioned in the sand on the bottom. Thus it is not suitable to solve the same problem as the present invention.

The solution comprising sensors positioned outside the cable is well known, and has proved not to give optimal measurements, partially because their positions relative to the cable when landing on the sea floor affects the measurements. The primary reason was that they should lie relatively independent of the cable, but practice has shown that they normally land in contact with the cable on the sea floor and are thus affected e.g. by vibrations propagating along the cable. Because of operational conditions it has also become usual to tape these outer sensors to the cable, so that they, when laid on the sea floor, come underneath, beside or over the cable, which in a large degree affects the measurements. In this case also the sensors are given a specific weight corresponding to the environment.

It is an object of this invention to provide a compact and robust seismic cable in which the weight is distributed over a small area, so as to obtain good acoustic coupling to the sea floor when this consists of relatively loose materials such as sand and sediments.

It is thus an object of the present invention to provide a robust seismic cable as defined above, having well defined contact points against the sea floor. This is obtained with a seismic cable being characterized as stated in claim 1.

The seismic cable according to the invention has a cable between the sensor units having substantially smaller physical dimensions than the sensor units, which is advantageous, both regarding the influence for sea currents during deployment and positioning on the sea bed and after being positioned there. Also, the cable will demand less room when stored on a drum.

The cable may also comprise suitable, per se known, materials or solutions for damping vibrations along the cable. This may be done with suitable means for attenuate vibrations or by letting them be attenuated through the cable to the sea floor.

The invention will be described below with reference to the accompanying drawings, illustrating by way of example possible embodiments of the invention.

Figure 1:
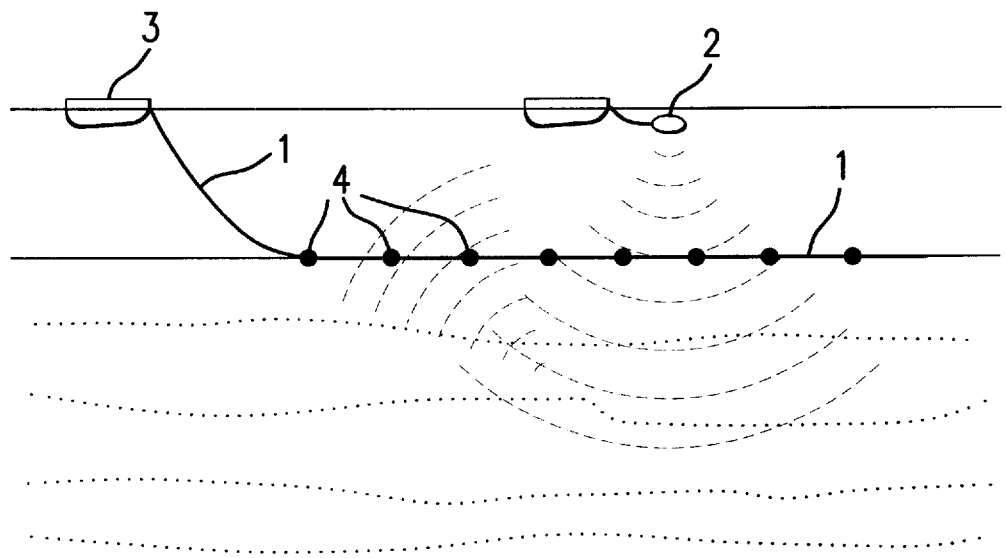
FIG. 1 illustrates schematically the use of a bottom cable.

FIG. 1 shows a typical situation when using a bottom cable 1. A seismic source 2 emits pressure waves down toward the sea floor. Parts of the pressure waves are reflected in geological formations upward to the sea floor as pressure and shear waves, and are detected by different sensors in the sensor units 4. The cable 1 will usually lie quietly during each sequence of measurements, and during a number of subsequent emissions from the seismic source.

A typical sequence will consist of deploying the cable in a required position on the sea bed and the seismic source is activated at a number of positions, so that the measured reflections arise from several different parts of the geological formations below the sea floor. Then the cable is moved and the source is activated with a new set of positions.

The sensor units 4 will usually be spaced approximately 25 meters apart, but spacings from 6 meters and upward may be used depending on the situation.

In the figure the cable is towed by a surface vessel 3, but solutions may also be contemplated in which it is towed by different types of subsurface vessels.

The acoustic source 2 is in FIG. 1 shown as a pure pressure wave source, e.g. an air gun or electrodynamic source. Sources which may be positioned on the sea floor and generate shear waves in addition to, or possibly instead of, pressure waves may also be used.

Figure 2:
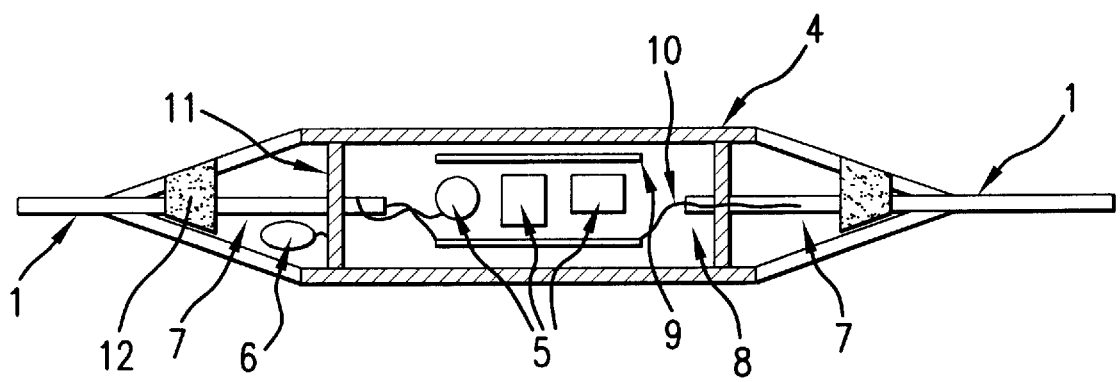
FIG. 2 shows a section of a sensor unit according to the invention.

FIG. 2 shows an example of a sensor unit 4 according to the invention comprising three geophones 5 mounted in a water tight room 8, defined by walls 11 with pressure feedthroughs for e.g. coaxial cables 10. The geophones 5 are preferably positioned with orthogonal orientations relative to each other, so as to measure movements along all three axis. The geophones may be of any available type, both traditional geophones and electronic acceleration sensors of the semiconductor type, without having any importance for the scope of the invention except for the effect on the dimensions or weight of the sensor unit. Preferably the geophone are, however, gyro stabilized and provided with a gimbal for maintaining the required orientation so that the directions of the detected movements are predictable. Alternatively the sensor unit may be provided with a gravitation sensor (not shown) with a constant orientation relative to the sensors, so that the real movements may be calculated based on the measured movements and the measured orientation of the gravity. This does, however, require a substantial amount of computing.

In addition to the geophones 5 the sensor unit 4 comprises a hydrophone 6 adapted to measure pressure waves. The hydrophone 6 is positioned in a water filled room 7 in order to have an optimal contact with the surrounding medium. The hydrophone may be of any suitable type.

Both the hydrophone and the geophones 5 are connected to electronic circuits 9 for transmitting the signals along the cable to the data assembly unit positioned in the vessel 3, or possibly in a buoy. To minimize the weight and volume of the cable the signals are digitized and sent through the same conductors, e.g. a coaxial cable 10. An alternative is signal transmission through optical fibres, having low weight and small dimensions and being insensitive to disturbances from outside, but which needs a separate power supply.

The sensor unit according to FIG. 2 is also provided with tension relievers 12, which in addition to what is shown may in a per se known way include a bend restrictor.

According to one example of an advantageous embodiment the invention being based on a sensor unit in a system with 25 meters separating the sensor units, as indicated in FIG. 2, the sensor units may have a weight in air being approximately 18 kg (approximately 14 kg in sea water), while 25 meters of the corresponding cable has a weight being 23 kg in air (19 kg in sea water), while the corresponding numbers for the volume is 4500 cm$^3$, both for the sensor unit and the 25 meters of cable, the sensor unit having a length of 0.7 meters. Weight per metre for the sensor unit is thus appr. 25 kg. It should, however, be noted that these numbers may vary within the scope of the invention, and should not be understood as absolute requirements.

Figure 3A:
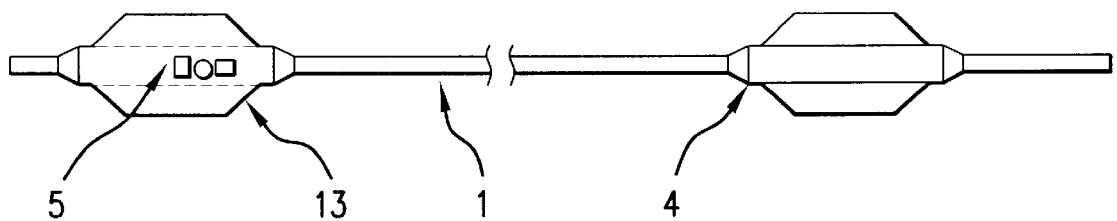
FIGS. 3A and 3B shows a part of a cable according to the invention in which the sensor units are provided with weight shields.
Figure 3B:
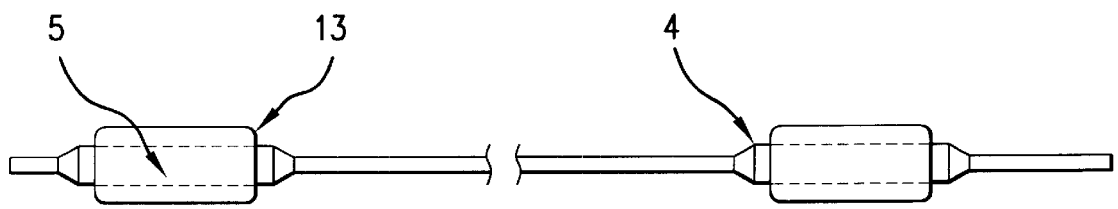

FIGS. 3A and 3B shows a part of a cable according to the invention in which the sensor elements 4 are provided with weight shields 13 in order to increase the weight relative to the cable. He weight itself may vary depending on the sensor unit and the shape of the weight shield, preferably to optimize the coupling to the sea bottom in the frequency range of 3–150 Hz. In addition the weight relative cable weight per length unit is chosen, so that the ratio between the cable and the sensor weight per length unit is preferably larger than 1/10, and especially 1/30. In some cases ratios up to 1/5 may be used. The chosen weights will vary depending on the seismic measuring system, as the cable weight among other things will depend on the number of conductors needed for power supplies an signal transmission, requirements for pressure load depending on the use at different sea depths, and tension requirements.

Regarding the outer embodiment of the sensor units it is, as mentioned in the discussion of U.S. Pat. No. 5,365,491, important that they have a hard outer surface which is not shaped by the surface it is placed upon, e.g. steel or polyester. Rubber may be used in some cases, but may give vibrations between the sensor unit and the supporting surface.

In FIGS. 3A and 3B the sensor units are provided with weight shields for improving the contact with the supporting surface, in which the weight shields have larger width than height. In addition they may be provided with e.g. sharp edges or pins for obtaining a good grip against the sea floor, and thus better acoustic coupling. This must, however, be adapted to the handling equipment being used to deploy or retrieve the cable.

As mentioned above the volume ratio between the sensor units and the cable also affect the function of the cable. In general the physical dimensions of all the components should be minimized to make them independent of sea current conditions during deployment and positioning of the cable, and when it is lying on the sea floor. Because of the weight distribution it would be advantageous if the lighter cable has a small diameter, so that the sensitivity for water movements is reduced. During measurements such movements could create vibrations in the cable which in its turn may affect the measurements performed by the geophones.

In addition the reduced dimensions will result in a reduced cable rigidity, so that the response of the sensor units in the longitudinal direction of the cable is not affected by the cable rigidity in the same degree as a known systems.

An aspect influencing the weight and size of the cable is the way information is transferred to the towing vessel. A cable having one pair of electrical conductors for transmitting signals for each sensor or sensor unit will have significant dimensions when cables having a certain length is used. These cables will therefore be very thick and stiff. In order to avoid this problem the signals will, as mentioned above, be digitized and transmitted in one or more coaxial cable using well known techniques for multiplexing signals, so that the signals are transmitted from the different sensors essentially at the same time. Optical signal transmission will also be possible, and will have great advantages such as the bandwidth and dimensions of the optical cable or cables. Another limiting factor in minimizing the cable diameter is the power supply. It will therefore be preferable if the different components use as little energy as possible in the measurements, and when processing and transmitting the results of the measurements.

Figure 4:
FIG. 4 illustrates the cable thickness relative to the sensor units when the separating cables is long.
Figure 5:
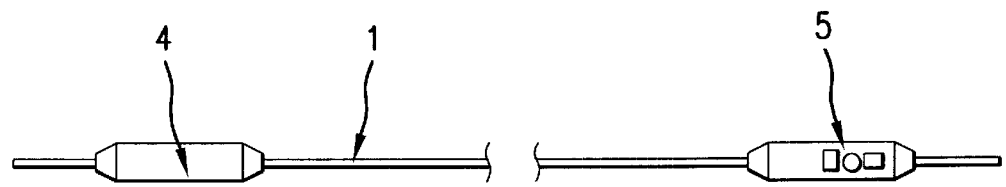
FIG. 5 illustrates the cable thickness relative to the sensor units when the separating cables is short.

FIGS. 4 and 5 illustrates the difference between cable relative to the sensor units 4 at long (FIG. 4) and short (FIG. 5) cables with corresponding distance between the sensor units.

What is claimed is:

1. Seismic cable for positioning at the sea floor comprising at least two seismic sensor units (4) adapted to detect vibrations in the sea bottom and being separated by chosen lengths of cable (1), characterized in that the weight ratio per length unit between the cable and the sensor units (4) is maximum 1/5, that the seismic sensor units (4) comprises at least one sensor, including at least one geophone (5), being integrated in the cable, that each sensor unit also comprises means for digitizing the signals from each sensor (5,6), and that the cable comprises at least one conductor for transferring the digitized signals from the sensors.

2. Seismic cable according to claim 1, characterized in that the ratio between the cable weight and the sensor weight per length unit is maximum 1/10, e.g. in the range of 1/30.

3. Seismic cable according to claim 1, wherein the weight per length of the sensor units (4) in air is approximately 25 kg/m.

4. Seismic cable according to claim 1, wherein the weight of the sensor units (4) is adapted to provide an acoustic coupling to the sea floor in the frequency range of 3–150 Hz.

5. Seismic cable according to claim 1, wherein the sensor units (4) comprises three geophones (5), each with a direction of sensitivity being perpendicular to the other.

6. Seismic cable according to claim 1, wherein the sensor units (4) comprises at least one hydrophone (6).

7. Seismic cable according to claim 1, wherein the circumference of the cable (1) is less than the circumference of the sensor units (4).

8. Seismic cable according to claim 7, characterized in that the ratio between the cable volume per meter and the sensor unit volume per metre is about 1/2 or less.

9. Seismic cable according to claim 1, wherein the sensor unit (4) comprises a bend restrictor.

10. Seismic cable according to claim 1, wherein the cable (1) between the sensor units is adapted to attenuate acoustic vibrations propagating along the cable.

* * * * *